United States Patent
Saltzer et al.

(10) Patent No.: US 7,424,367 B2
(45) Date of Patent: Sep. 9, 2008

(54) METHOD FOR PREDICTING LITHOLOGY AND POROSITY FROM SEISMIC REFLECTION DATA

(75) Inventors: Rebecca L. Saltzer, Houston, TX (US); Christopher J. Finn, Missouri City, TX (US); Shiyu Xu, Kingwood, TX (US); Michael E. Farrell, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 167 days.

(21) Appl. No.: 11/587,418

(22) PCT Filed: Jan. 24, 2005

(86) PCT No.: PCT/US2005/002160

§ 371 (c)(1),
(2), (4) Date: Oct. 25, 2006

(87) PCT Pub. No.: WO2005/119276

PCT Pub. Date: Dec. 15, 2005

(65) Prior Publication Data

US 2008/0015782 A1    Jan. 17, 2008

Related U.S. Application Data

(60) Provisional application No. 60/574,901, filed on May 27, 2004.

(51) Int. Cl.
*G01V 1/00* (2006.01)

(52) U.S. Cl. .............................. 702/14; 702/28; 702/8; 702/11; 702/12; 702/13; 702/182; 250/256; 367/18; 367/25; 367/73; 703/5; 703/9; 703/10

(58) Field of Classification Search ................. 702/8, 702/11–14, 182; 250/256; 367/18, 25, 73; 703/5, 9–10
See application file for complete search history.

(56) References Cited

U.S. PATENT DOCUMENTS

| 5,539,704 A | 7/1996 | Doyen et al. ............... 367/73 |
| 5,586,082 A | 12/1996 | Anderson et al. ........... 367/73 |
| 5,675,147 A | 10/1997 | Ekstrom et al. ............. 250/256 |
| 6,236,943 B1 | 5/2001 | Aminzadeh et al. .......... 702/16 |

(Continued)

OTHER PUBLICATIONS

Anderson, J. et al. (2000) "Quantifying Fluid Prediction Using Angle-Dependent Inversion Measured Against Log Fluid Substitutions," *Annual Offshore Tech. Conf.*, v. 2, XP: 001041239, pp. 187-192.

(Continued)

*Primary Examiner*—Tung S Lau
*Assistant Examiner*—Sujoy K Kundu
(74) *Attorney, Agent, or Firm*—ExxonMobil Upstream Research Co. Law Dept.

(57) ABSTRACT

Method for predicting lithology and porosity of subsurface rocks from seismic reflection data. The seismic data is inverted to yield elastic properties of the rocks such as the compressional and shear impedances. A rock physics model is built to relate porosity, the shale volume fraction, the fluid content of the rock and the elastic properties of the rock. The model is run backward in a second inversion process to solve for porosity and lithologic properties such as the shale volume fraction.

11 Claims, 1 Drawing Sheet

U.S. PATENT DOCUMENTS

| | | | |
|---|---|---|---|
| 6,269,311 B1* | 7/2001 | Berryman | 702/18 |
| 6,302,221 B1 | 10/2001 | Hamman et al. | 175/50 |
| 6,665,615 B2 | 12/2003 | Van Riel et al. | 702/2 |
| 6,718,265 B2 | 4/2004 | Herron et al. | 702/8 |
| 6,876,928 B2 | 4/2005 | Van Riel et al. | 702/189 |
| 6,954,402 B2 | 10/2005 | Brygynevych | 367/25 |
| 6,957,146 B1 | 10/2005 | Taner et al. | 702/14 |
| 6,961,673 B2 | 11/2005 | Barnes | 702/182 |
| 7,373,251 B2* | 5/2008 | Hamman et al. | 702/14 |

OTHER PUBLICATIONS

Batzle, M et al. (1992) "Seismic properties of pore fluids," *Geophysics*, v. 57.11, pp. 1396-1408.

Bruner, W. M. (1976) "Comment on Seismic Velocities in Dry and Saturated Cracked Solids by Richard J. O'Connell and Bernard Budianskey," *Journal of Geophysical Research*, 81, pp. 2573-2576.

Buland, B. et al. (1996) "AVO Inversion of Troll Field data," *Geophysics*, v. 61.6, pp. 1589-1602.

Carazzone, J. (1993) "Elastic Inversion of Gulf of Mexico Data, in Offset-Dependent Reflectivity", *Theory and Practice of AVO Analysis*, edited by John P. Castagna and Milo M. Backus, SEG.

Cheng et al. (1979) "Inversion of Seismic Velocities for Pore Aspect Ratio Spectrum of a Rock", *Journal of Geophysical Research*, 84, pp. 7533-7543.

Gassman, F. (1951) "Elasticity of Porous Media", *Vierteljahrschridt der Naturforschenden Gesellschaft in Zurich*96, pp. 1-21.

Goldberg, I. et al. (1998) "A Semi-Empirical Velocity-Porosity-Clay Model for Petrophysical Interpretation of P- and S-velocities", *Geophysical Prospecting*, 46, pp. 271-285.

Jorstad, A. et al. (1999) "Model-Based Shear-Wave Velocity Estimation Versus Empirical Regressions", *Geophysical Prospecting*, 47, pp. 785-797.

Kuster, G. T. et al. (1974) "Velocity and Attenuation of Seismic Waves in Two-Phase Media: Part 1: Theoretical Formulation", *Soc. of Exploration Geophysicists*, v. 39.5, pp. 587-606.

Menke, (1984) *Geophysical data analysis: discrete inverse theory*, Academic Press.

Press, W. et al., (1986) *Numerical Recipes: The Art of Scientific Computing*, Cambridge University Press, pp. 254-259.

Tarantola, (1987) *Inverse problem theory: methods for data fitting and model parameter estimation*, Elsevier Science Publishers.

Tonellot, T. et al. (1999) "Prestack elastic waveform inversion using a priori information", *SEG Expanded Abstracts*.

Xu, Shiyu et al. (1996) "A Physical Model for Shear-Wave Velocity Prediction", *Geophysical Prospecting*, 44, pp. 687-717.

Xu, Shiyu et al. (1995) "A New Velocity Model for Clay-Sand Mixtures", *Geophysical Prospecting*, 43, pp. 91-118.

EP Standard Search Report No. 111596 dated Dec. 17, 2004 3 pages.

PCT International Search Report (2006) 4 pages.

* cited by examiner

METHOD FOR PREDICTING LITHOLOGY AND POROSITY FROM SEISMIC REFLECTION DATA

This application claims the benefit of U.S. Provisional Application No. 60/574,901, filed May 27, 2004.

FIELD OF THE INVENTION

This invention relates generally to the field of characterizing hydrocarbon reservoirs and, more particularly, to lithology inversion and methods for predicting sand (or shale) volume and porosity in sub-surface rocks. Specifically, the invention is a method for predicting lithology and porosity from seismic reflection data.

BACKGROUND OF THE INVENTION

In characterizing hydrocarbon reservoirs, estimating reserves, and developing models for how to best extract the hydrocarbons, it is useful to know the lithology (for example, relative amounts of shale and sand) and associated porosity of the rocks in the target interval. Rock properties can be measured directly from rock samples obtained from wells but such samples are generally very limited in availability due to the expense of drilling those wells. These properties can also be inferred from seismic data. Because of the complicated nature of the theoretical relationships between the seismic data (reflectivity) and the important rock properties (lithology, porosity, and fluid content), these two quantities are often related in practice through empirical relationships derived at wells, where both seismic and well measurements coexist. These empirical relationships are then applied to the entire volume of seismic data (or attributes derived from them) in order to make predictions about rock properties away from the wells. The problem is that empirical models require a statistically significant sampling of data and yet the wells provide very limited and generally biased samples of the reservoir properties. In regions where a large number of wells have been drilled, pattern-based recognition methods and simple empirical relationships can be used successfully to infer rock properties from seismic data. However, in regions of limited well control, it is difficult to make accurate lithology predictions using empirical relationships derived from just a few wells.

A commonly used method for determining clay content and porosity from seismic data (or attributes of the seismic data) is to use linear regression to solve an equation of the following form:

$$\text{Impedance} = A \cdot \phi + B \cdot \text{vshale} + C$$

where $\phi$ is the porosity, vshale is the shale volume and A, B and C are the constants that relate the porosity, vshale and impedances (or some other seismic attribute of interest) to one another. Regression methods are more robust when they are used with larger datasets obtained from wells penetrating different sections of the reservoir so that there is a statistically significant sampling of the data. In regions of limited well control the relationships derived in this manner cannot be used with confidence.

Another class of methods used to predict clay content and porosity from seismic data uses pattern recognition, often implemented with neural networks, to construct the necessary relationships. These methods use a training set to identify patterns between the well and the seismic data and then classify the remainder of the seismic data set according to the patterns observed in the training set. The resulting relationships can be quite complicated (and certainly allow more complexity than the simple linear regression of the above-stated equation), but they are still fundamentally empirical relationships based on observations at the well rather than on a physical description. Consequently, these methods suffer from the same problem as the regression methods in that they require enough data examples (wells) in order to train the network competently. With sufficient well control they can be very good interpolators (although generally poor extrapolators). In regions of limited of well control, they are unreliable interpolators (as well as poor extrapolators).

SUMMARY OF THE INVENTION

In one embodiment, the invention is a method for predicting lithologic properties and porosity of a subsurface formation from seismic data, comprising:

(a) inverting the seismic data to obtain one or more bulk elastic properties of the subsurface formation;

(b) constructing a rock physics model of the subterranean formation, said model relating the lithologic properties, porosity and fluid content to the bulk elastic properties of the formation rock, said model comprising the following two features: (i) compliances and densities of sand and clay mineral fractions of the rock are characterized independently with separate pore spaces, different pore aspect ratios, and potentially different fluid types, and (ii) effective bulk and shear elastic moduli are computed using a combination of differential effective medium theory and Gassman fluid substitution;

(c) building a fluid fill model indicating the type of fluid present at each location in the subsurface;

(d) computing in tabular form values of said one or more elastic properties as predicted by the rock physics model for a range of possible values for said porosity and lithology properties in each fluid type present in the model and then numerically computing corresponding tables of the derivatives of the elastic properties with respect to porosity and clay content; and (e) using the computed tables of the elastic properties and their derivatives, along with the fluid type information to minimize a pre-selected objective function and thereby invert the rock physics model to obtain the lithologic properties and the porosity from the bulk elastic properties and fluid content information for the formation.

Typical bulk elastic properties include compressional impedance, shear impedance, bulk modulus, shear modulus, compressional velocity, shear velocity or any other elastic parameters. Typical lithologic properties include the volume fractions of shale (clay) and of sand.

In some embodiments of the invention, the rock physics model has a solid matrix composed of sands and clays and a total pore space partitioned into clay-related pores and sand-related pores, and the clay-related pores are assumed to be filled primarily by water (actually brine). In some of these embodiments, the pressure equalization assumptions for the clay pores differ from the sand pores. For example, the brine-filled clay-related pores may be added during the effective media calculation so that only the sand-related pores are filled using Gassman theory. This corresponds to the mixed frequency case where the pressure within the clay pores is not equalized during the passage of a seismic wave while the pressure in the larger sand pores is equalized. In other embodiments of the present invention, both the sand-related and clay-related pores are empty during the differential effective medium computation and are later filled with fluid using Gassman theory.

In some embodiments of the invention, the second inverting step solves for the lithologic properties and porosity using an iterative process and converging to a solution by minimizing the squared difference, or optimizing the $L_1$ norm of the difference, between the bulk elastic properties obtained from the seismic data and the values obtained for the same properties by forward modeling with the rock-physics model. In other related embodiments, the iterative process converges to a solution by finding a maximum a posteriori estimate (MAP) of the lithologic properties and porosity using model and data covariance matrices estimated from well data and inversion results at such well. In some of the above-described embodiments, the iterative process is Newton-Raphson iteration. To speed up and simplify the solution process, some embodiments of the invention further comprise constructing a table of P and S impedances that have been forward modeled with the rock physics model for representative values of clay content and porosity; and pre-computing tables of the derivatives of the P and S impedances with respect to porosity and clay content using finite difference approximations. The second inverting step is then performed by taking the pre-computed tables and performing a non-linear inversion to determine the combination of clay content and porosity that is consistent with the P and S impedances at each point in the seismic data volume.

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a method for inferring the clay content and porosity of a reservoir from seismic reflection data. [The terms "shale" and "clay" are used interchangeably herein.] It is based upon the physics of wave propagation through elastic media and a rock physics model relating the elastic properties of rocks to their grain and fluid components and their micro-pore structure. Therefore it mathematically relates the lithologic description of the rocks to their seismic response and does not rely on empirical models. Because a theoretical model of the rock physics is used, a statistically significant sampling of "ground truth" is not needed, and the method can be applied with limited well control early in the development cycle when uncertainties are highest and economic risk is greatest. The rock porosity and lithology are predicted simultaneously, ensuring that these two quantities are consistent with both the data and the rock physics model. Furthermore, this approach can simultaneously predict the reservoir quality in both the hydrocarbon and brine legs of a reservoir and does not require separate calibrations in the various fluid phases as is necessary with empirical methods.

Figure 1:
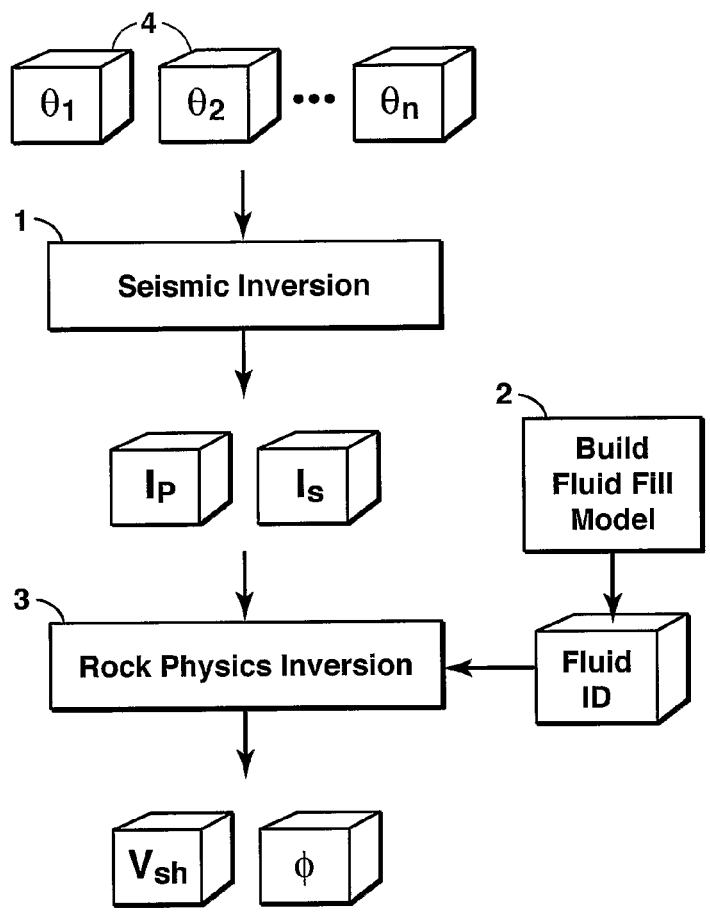
FIG. 1 is a flow chart showing the primary steps of one embodiment of the present invention.

The method consists of three steps, as illustrated in FIG. 1. In step 1, the seismic data are inverted for elastic properties such as compressional (P) and shear (S) impedances ($I_p$ and $I_s$, respectively) using standard techniques. (The seismic data are shown separated into at least two constant angle stacks 4 because this is necessary in order to reliably obtain both the P and S impedances.) Other elastic properties such as the bulk modulus and shear modulus, or combinations thereof such as compressional and shear velocity may also be used. Such inversion techniques are described in, for example, T. Tonellot, D. Mace, V. Richard, "Prestack elastic waveform inversion using a priori information," *SEG Expanded Abstracts* (1999); James J. Carazzone and Leonard J. Srnka, "Elastic Inversion of Gulf of Mexico Data, in Offset-Dependent Reflectivity", *Theory and Practice of AVO Analysis*, edited by John P. Castagna and Milo M. Backus, SEG (1993); Arild Buland, Martin Landro, Mona Andersen, and Terje Dahl, "AVO Inversion of Troll Field data," *Geophysics*, 1589-1602 (1996). In Step 2, the fluid type (gas, oil, brine, etc.) is defined for each and every point in the elastic properties volume and in this manner a fluid fill model is built. In step 3, the elastic properties obtained in step 1 are combined with fluid information compiled in step 2 and converted to lithology and porosity (fractional shale volume $V_{sh}$ and porosity $\phi$ are shown in FIG. 1) using an appropriate rock physics model. Step 3 is applied as a second or cascaded inversion following the seismic inversion in step 1.

In order to perform the second inversion, the present invention uses a rock physics model that relates porosity, volume of shale or clay, $V_{SH}$, and fluid content to the bulk elastic properties of the rock such as P-impedance and S-impedance. A preferred model in clastic environments is the shaly-sand mixture model described in Xu and White, "A new velocity model for clay-sand mixtures," *Geophysical Prospecting* 43, 91-118 (1995), and in Xu and White, "A physical model for shear wave velocity prediction," *Geophysical Prospecting* 44, 687-717 (1996), or modifications of that model such as those described herein. The Xu-White model is complex, and inverting it poses a major problem. The present inventive method solves this problem in a practical and efficient way.

The model has two key features. First, the compliances of the sand and clay mineral fractions of the rock are characterized independently with separate pore spaces and different effective pore aspect ratios. Second, the bulk and shear elastic moduli of the dry frame are computed using a combination of the scattering theory of Kuster and Toksöz's "Velocity and attenuation of seismic waves in two-phase media: Part 1: Theoretical formulation", *Geophysics* 39, 587-606 (1974) and the differential effective medium theories of Bruner in "Comment on Seismic Velocities in Dry and Saturated Cracked Solids by Richard J., O'Connell and Bernard Budianskey", *Journal of Geophysical Research* 81, 2573-2576, (1976) and Cheng and Toksöz in "Inversion of seismic velocities for pore aspect ratio spectrum of a rock", *Journal of Geophysical Research*, vol 84, pp. 7533-7543 (1979). Equations disclosed by Gassman in "Elasticity of porous media", *Vierteljahrschift der Naturforschenden in Zürich*, vol 96, pp. 1-21 are then applied to obtain the low frequency velocity in the fluid-saturated rock. This model computes relationships between velocity, density, clay content and porosity that are explicit, consistent and physically based. As a result, a large number of nearby wells or assumed analogs are not required to characterize the subsurface. The model is next described in more detail for certain embodiments of the present invention.

The mathematical expressions in the selected rock physics model provide a method for determining P and S velocities and densities in rocks given clay content, porosity, water saturation and fluid properties. These parameters can be recombined to give the impedances or any other set of isotropic elastic properties that are produced in step 1. A typical model assumes a solid matrix made of sands and clays. The total pore space can be partitioned into clay-related pores and sand related pores. If φ denotes total porosity, then $$\phi = \phi_S + \phi_C \quad (1)$$

where $\phi_S$ is the portion of the rock occupied by stiff or sandstone pores, and $\phi_C$ is the porosity associated with compliant or shale pores. Fractional shale volume $V_{SH}$ and fractional sand volume $V_{SS}$ are used to estimate $\phi_C$ and $\phi_S$. Since $V_{SH} + V_{SS} + \phi = 1$, assuming that $\phi_C$ and $\phi_S$ are proportional to $V_{SH}$ and $V_{SS}$, respectively, implies that $$\phi_C = V_{SH} \frac{\phi}{1-\phi} \quad (2)$$

and $$\phi_S = V_{SS} \frac{\phi}{1-\phi}. \quad (3)$$

Having divided the pore space into compliant and stiff pores, the effect of pore shape on the elastic properties of the composite can be estimated using the following equations from the 1974 Kuster and Toksöz paper:

$$K_0 - K_m = \frac{1}{3}(K' - K_m)\frac{3K_0 + 4\mu_m}{3K_m + 4\mu_m}\phi_C T_{iijj}(\alpha_C) \quad (4)$$

and $$\mu_0 - \mu_m = \frac{(\mu' - \mu_m)}{5} \frac{6\mu_0(K_m + 2\mu_m) + \mu_m(9K_m + 8\mu_m)}{5\mu_m(3K_m + 4\mu_m)}\phi_C F(\alpha_C) \quad (5)$$

where $$F(\alpha) = T_{iijj}(\alpha) - \frac{T_{iijj}(\alpha)}{3} \quad (6)$$

in which $K_0$, $K_m$, and $K'$ are the bulk moduli of the effective medium with clay pores only, the rock matrix, and the pore inclusion material, respectively, and $\mu_0$, $\mu_m$, and $\mu'$ are the corresponding shear moduli. $\mu'$ is always zero for any pore fluids. $\alpha_C$ is the aspect ratios for compliant pores (clay pores); and $T_{iijj}(\alpha)$ and $F(\alpha)$ are pore aspect ratio functions derived from the tensor $T_{ijkl}$ that relates the uniform strain field at infinity to the strain field within an elastic ellipsoidal inclusion. The moduli of the rock matrix are a mixture of the sand and clay grain moduli, mixed using the Voight-Ruess-Hill average according to their relative proportions as given by the $V_{SH}$ value.

$$K_m = \frac{1}{2}\left\{V_{sh}K_{sh} + (1-V_{sh})K_{ss} + \frac{1}{\left[\frac{V_{sh}}{K_{sh}} + \frac{(1-V_{sh})}{K_{ss}}\right]}\right\} \quad (7)$$

and $$\mu_m = \frac{1}{2}\left\{V_{sh}\mu_{sh} + (1-V_{sh})\mu_{ss} + \frac{1}{\left[\frac{V_{sh}}{\mu_{sh}} + \frac{(1-V_{sh})}{\mu_{ss}}\right]}\right\} \quad (8)$$

The symbols $K_{sh}$ and $\mu_{sh}$ in equations (7) and (8) are the bulk and shear moduli of the clay minerals. The symbols $K_{ss}$ and $\mu_{ss}$ in equations (7) and (8) are the bulk and shear moduli of the sand minerals. The equations for the pore aspect ratio functions $T_{iijj}(\alpha)$ and $F(\alpha)$ in equation (6) are given in the Appendix of the 1995 Xu and White article.

In one embodiment of the invention, a key modification relative to the published models is the further assumption that clay pores are filled primarily with bound water, because of the relatively high capillary pressure in clay pores as a result of the extremely small sizes of clay particles. A further modification is to assume that the pressure in these small pores is not equalized with the passage of a seismic wave because of their small pore throats. Mathematically, this is equivalent to saying they are unrelaxed and comprise a high-frequency component of the system. Since sand-related pores tend to be much bigger than clay-related pores, pore fluids in sand-related pores can be equalized easily. At seismic frequencies, these pressure-equalized sand-related pores can be treated mathematically as being relaxed and comprising a low frequency component of the system. In this embodiment of the present invention, the Kuster-Toksöz equations are again used to calculate the elastic properties of the "dry rock frame" (sand pores only) letting K' and μ' be zero.

$$K_d - K_0 = -\frac{1}{3}K_0 \frac{3K_d + 4\mu_0}{3K_0 + 4\mu_0}\phi_S T_{iijj}(\alpha_S) \quad (9)$$

and $$\mu_d - \mu_0 = -\frac{\mu_0}{5} \frac{6\mu_d(K_0 + 2\mu_0) + \mu_0(9K_0 + 8\mu_0)}{5\mu_0(3K_0 + 4\mu_0)}\phi_S F(\alpha_S). \quad (10)$$

Here $K_d$ and $\mu_d$ are the bulk and shear moduli of the "dry rock frame", and $\alpha_s$ is the aspect ratios for stiff pores (sand pores). However, the Kuster-Toksöz equations require $$\frac{\phi}{\alpha} \ll 1.$$

Typical values for aspect ratios are 0.035 for shale pores and 0.12 for sandstone pores. Therefore, the Kuster-Toksöz equations are applicable only for very low porosity. The differential effective medium method may be incorporated into the Kuster-Toksöz formulations to overcome this restriction. To apply the differential effective medium method, the total porosity is preferably modified using the following equation before partitioning the pore space.

$$\phi' = -\ln(1-\phi) \quad (11)$$

The modified total pore space is then partitioned into sets of pores so that the pore concentration for each set satisfies the Kuster-Toksöz condition. Beginning with solid rock, the Kuster-Toksöz equations are used to compute the effective medium that results from adding a small set of pores to the matrix. In another key modification relative to the method described in Xu and White (1995), the small set of pore space is then divided into sand-related and clay-related portions using equations (1) to (3). The Kuster-Toksöz equations (4) to (10) are then used to calculate the effect of clay-related and sand-related pores on elastic properties. The process is repeated, using the effective medium from the previous calculation as the rock matrix for the next calculation, until the total pore volume has been added to the rock. Finally, Gassmann's equation (referenced previously) is used to put pore fluids into the sand pores.

$$K = K_d + \frac{\left(1 - \frac{K_d}{K_0}\right)^2}{\frac{\phi_S}{K_f} + \frac{(1-\phi_S)}{K_0} - \frac{K_d}{K_0^2}}, \quad (12)$$

$$\mu = \mu_d, \quad (13)$$

$$\rho = \phi \rho_f + (1-\phi)\rho_0. \quad (14)$$

After obtaining the effective bulk and shear moduli, P- and S-wave velocities can be calculated using the following equations:

$$V_P = \sqrt{\frac{\left(K + \frac{4}{3}\mu\right)}{\rho}}, \quad (15)$$

and $$V_S = \sqrt{\frac{\mu}{\rho}}. \quad (16)$$

In step 3 of FIG. 1, the impedances found in the step 1 are inverted for porosity and $V_{SH}$ for every point in the seismic volume using (in the described embodiment) the Xu-White forward model or its modifications described above. The porosity and $V_{SH}$ values that best fit the impedances are found by minimizing an objective function. Typically, the objective function will consist of a term measuring the match between the bulk elastic properties generated by the rock physics model and the bulk elastic properties obtained from seismic inversion, and a term constraining the predicted lithology and porosity. The simplest objective function is the least-squares objective function containing the squared difference between the forward modeled impedances and the observed impedances.

$$\epsilon^2 = (I_p - XW_p(\phi, V_{sh}))^2 + (I_s - XW_s(\phi, V_{sh}))^2 \quad (17)$$

Here, $I_p$ and $I_s$ are the impedances derived in the first step, and $XW_p$ and $XW_s$ are the forward modeled p and s impedances using the series of equations (1-15). As previously mentioned, other sets of isotropic elastic parameters could be used, depending on what was produced in step 1. The minimization of the squared error is a non-linear problem. A preferred method for solving this problem is a Newton-Raphson iteration (see W. Press, et al., *Numerical Recipes: The Art of Scientific Computing*, Cambridge University Press (1986) pp. 254-259). An initial guess at the solution is made, and then it is iteratively updated it by solving the linearized equation set $$\begin{bmatrix} \frac{\partial XW_p(\phi_k, V_{sh_k})}{\partial \phi} & \frac{\partial XW_p(\phi_k, V_{sh_k})}{\partial V_{sh}} \\ \frac{\partial XW_s(\phi_k, V_{sh_k})}{\partial \phi} & \frac{\partial XW_s(\phi_k, V_{sh_k})}{\partial V_{sh}} \end{bmatrix} \begin{bmatrix} \Delta \phi_k \\ \Delta V_{sh_k} \end{bmatrix} = \begin{bmatrix} I_p - XW_p(\phi_k, V_{sh_k}) \\ I_s - XW_s(\phi_k, V_{sh_k}) \end{bmatrix}. \quad (18)$$

The subscript k in equation (18) is an iteration index. In order to evaluate the coefficients on either side of equation (18), one can evaluate the modified Xu-White model at the current guess $\phi_k, V_{sh_k}$ as well as the derivatives of the model with respect to shale volume and porosity. The equations are then solved for a model update $\Delta\phi_k, \Delta V_{sh_k}$. This update is added to the current model. Iteration continues until the solution converges.

Equation set (18) must be solved at a substantial number of points in the seismic volume. Evaluation of the modified Xu-White model using equations (1)-(17) is time-consuming. Iteratively evaluating the modified Xu-White model for all points in a seismic volume would be very computationally intensive. Furthermore, the derivation of analytic expressions for the derivatives on the left-hand side of equation (18) is not tractable. To circumvent these difficulties, one can construct a table of P and S impedances (velocities scaled by density) that have been forward-modeled for representative combinations of clay content (0 to 100%) and porosity (0 to 40% in siliciclastics). Tables of the derivatives of the P and S impedances with respect to porosity and clay content are also pre-computed using finite difference approximations. The inverse rock physics modeling (running the model backwards) is done by taking the pre-computed tables and performing a non-linear inversion to determine the combination of clay content and porosity that is consistent with the P and S impedances derived at each point in the seismic volume.

Equations (1)-(17) describing the modified Xu-White rock physics model depend on the properties of the fluid filling the pore space through the bulk modulus $K_f$ and density $\rho_f$ of the fluid filling the sand pores in equations (12) and (14) respectively, as well as through the bulk modulus of the fluid filling the clay pores K' in equation (4). As described previously, the clay pores are filled with brine. The sand pores however, are filled with the appropriate reservoir fluid, either brine or a combination of brine and hydrocarbons. The brine and hydrocarbons are mixed in proportion to the water saturation. Typically, a fixed effective water saturation is specified. In order to apply the second inversion, the pore fluid at every point in the seismic volume must be specified (step 2 in FIG. 1). This involves defining the regions of the reservoir corresponding to the hydrocarbon leg (either gas and/or oil) and the brine leg. The regions of the seismic volume corresponding to the different fluids can be constructed from the interpreted seismic horizons and polygons defining the reservoir and from the depths of the fluid contacts either penetrated in the wells, or inferred from pressure measurements taken in multiple wells, or from geophysical evidence such as direct hydrocarbon indicators. Each region is identified in the volume with a fluid identification flag. This fluid identification flag is associated with bulk moduli and densities appropriate for the fluid type (gas, oil, or brine) and its environmental (pressure and temperature) conditions as well as its relevant compositional parameters (gas gravity for gas, API and gas oil ratio for oil, and salinity for brine). All these factors are determined from relevant measurements made in wells, and then translated into fluid bulk moduli and densities using appropriate models such as those described by Michael Batzle and Zhijing Wang, "Seismic properties of pore fluids," *Geophysics*, 1396-1408 (1992). The Xu-White tables and its derivatives used in the application of equation (18) during the rock physics inversion must be pre-computed for each unique fluid identification flag in the fluid ID volume. The appropriate set of tables is then applied at each point in the volume during the rock physics inversion.

Some of the constants used in the rock physics modeling require calibration. In particular, the pore aspect ratios of the sand and clay, as well as the grain properties of the clay are preferably adjusted to fit available well data prior to performing the rock, physics inversion of the seismically derived elastic properties. This calibration step consists of using shale volume and porosity values derived from well logs along with the appropriate fluid properties to forward-model the elastic properties and compare them with measured density and sonic logs in the well. The rock physics parameters are adjusted until a reasonable match between predicted and recorded well logs is obtained.

Because the elastic properties derived from the inversion in step 1 of FIG. 1 can be noisy and therefore inconsistent with the modeled impedances, strictly minimizing a least squares objective function as in equation (17) can produce noisy estimates of the rock properties. It is often desirable to modify the objective function so as to add some constraints in the rock physics inversion (step 3). A common strategy is to perform damped least squares by adding an additional term to the objective function in which the model with the minimum squared length is sought. A number of other strategies can be employed, as detailed in various textbooks on geophysical inversion such as Menke, *Geophysical data analysis: discrete inverse theory*, Academic Press (1984). A preferred approach is to use the maximum likelihood estimator detailed in Tarantola, *Inverse problem theory: methods for data fitting and model parameter estimation*, Elsevier Science Publishers (1987). Appropriate data and model covariance matrices are derived from data measured at the well locations during the calibration step. Equation (17) measures the error using an $L_2$ norm. Other norms, such as an $L_1$ norm, can be used to measure the error as well.

EXAMPLES

Figure 2:
FIG. 2 is a three-dimensional view of sand bodies as predicted by the present inventive method from actual seismic data.

The present inventive method was applied to seismic data acquired over a reservoir containing gas, oil and brine. FIG. 2 shows a 3-D image of the inferred sand channel winding through the inverted $V_{SH}$ volume (the shaly parts have been made invisible) produced by the present inventive method. Two wells drilled in the reservoir confirm the location of the sands and the volume percentages. In addition to aiding in well placement, accurate sand/shale volume predictions such as that represented by FIG. 2 can be used to estimate reserves, both of which are important in the early development phases of a field when well control is limited and business risk is greatest.

The foregoing description is directed to particular embodiments of the present invention for the purpose of illustrating it. It will be apparent, however, to one skilled in the art, that many modifications and variations to the embodiments described herein are possible. For example, persons skilled in the art will know of other modifications to the differential effective media model. All such modifications and variations are intended to be within the scope of the present invention, as defined by the appended claims.

We claim:

1. A method for predicting lithologic properties and porosity of a subsurface formation from seismic data, comprising:
   (a) inverting the seismic data to obtain one or more bulk elastic properties of the subsurface formation;
   (b) constructing a rock physics model of the subterranean formation, said model relating the lithologic properties, porosity and fluid content to the bulk elastic properties of the formation rock, said model comprising the following two features: (i) compliances and densities of sand and clay mineral fractions of the rock are characterized independently with separate pore spaces, different pore aspect ratios, and potentially different fluid types, and (ii) effective bulk and shear elastic moduli are computed using a combination of differential effective medium theory and Gassman fluid substitution;
   (c) building a fluid fill model indicating the type of fluid present at each location in the subsurface;
   (d) computing in tabular form values of said one or more elastic properties as predicted by the rock physics model for a range of possible values for said porosity and lithology properties in each fluid type present in the model and then numerically computing corresponding tables of the derivatives of the elastic properties with respect to porosity and clay content; and
   (e) using the computed tables of the elastic properties and their derivatives, along with the fluid type information to minimize a pre-selected objective function and thereby invert the rock physics model to obtain the lithologic properties and the porosity from the bulk elastic properties and fluid content information for the formation.

2. The method of claim 1, wherein the bulk elastic properties are selected from the group consisting of compressional impedance, shear impedance, bulk modulus, shear modulus, compressional velocity, shear velocity and other elastic parameters.

3. The method of claim 1, wherein the lithologic properties comprise the volume fractions of shale and of sand.

4. The method of claim 1, wherein said model has a solid matrix composed of sands and clays and a total pore space partitioned into clay-related pores and sand-related pores, said clay-related pores being assumed to be filled primarily by bound water during the differential effective media computation and only the sand-related pores are filled using Gassman theory.

5. The method of claim 1, wherein said model has a solid matrix composed of sands and clays and a total pore space partitioned into clay-related pores and sand-related pores, and both are empty during the differential effective media computation and later filled with fluid using Gassman theory.

6. The method of claim 1, wherein the inversion of the rock physics model solves for the lithologic properties and porosity using an iterative process and converging to a solution by minimizing the squared difference between the bulk elastic properties obtained from the seismic data and the values obtained for the same properties by forward modeling with the rock-physics model.

7. The method of claim 6, wherein the iterative process is Newton-Raphson iteration.

8. The method of claim 1, wherein the objective function is the least-squares objective function containing the squared difference between elastic properties generated by the rock physics model and the elastic properties obtained from the seismic inversion step.

9. The method of claim 1, wherein the objective function is a damped least-squares objective function.

10. The method of claim 1, wherein the inversion of the rock physics model solves for the lithologic properties and porosity using an iterative process and coverging to a solution by optimizing the $L_1$ norm of the difference between bulk elastic properties obtained from the seismic data and values obtained for the same properties by forward modeling with the rock-physics model.

11. The method of claim 1, wherein the inversion of the rock physics model solves for the lithologic properties and porosity using an iterative process and converging to a solution by finding a maximum a posteriori estimate (MAP) of the lithologic properties and porosity using model and data covariance matrices estimated from well data and inversion results at the well.

* * * * *